United States Patent
Liang et al.

(10) Patent No.: US 10,869,294 B2
(45) Date of Patent: Dec. 15, 2020

(54) METHOD FOR TRANSMITTING AND RECEIVING PAGING MESSAGE AND ASSOCIATED APPARATUS

(71) Applicant: China Academy of Telecommunications Technology, Beijing (CN)

(72) Inventors: Jing Liang, Beijing (CN); Jing Fu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 34 days.

(21) Appl. No.: 16/324,866

(22) PCT Filed: Jul. 26, 2017

(86) PCT No.: PCT/CN2017/094500
§ 371 (c)(1),
(2) Date: Feb. 11, 2019

(87) PCT Pub. No.: WO2018/028432
PCT Pub. Date: Feb. 15, 2018

(65) Prior Publication Data
US 2019/0174457 A1    Jun. 6, 2019

(30) Foreign Application Priority Data
Aug. 12, 2016  (CN) .......................... 2016 1 0666484

(51) Int. Cl.
*H04W 68/00*    (2009.01)
*H04W 72/04*    (2009.01)
(Continued)

(52) U.S. Cl.
CPC ......... *H04W 68/005* (2013.01); *H04L 1/1614* (2013.01); *H04W 4/80* (2018.02);
(Continued)

(58) Field of Classification Search
CPC ....... H04L 5/001; H04L 5/005; H04L 5/0007; H04L 5/0048; H04L 5/0051;
(Continued)

(56) References Cited

U.S. PATENT DOCUMENTS

| 2011/0222463 A1* | 9/2011 | Wei ....................... H04L 5/0089 370/312 |
| 2012/0044910 A1* | 2/2012 | Maeda ................. H04L 5/0091 370/332 |

(Continued)

FOREIGN PATENT DOCUMENTS

| CN | 101742615 A | 6/2010 |
| CN | 101888590 A | 11/2010 |

(Continued)

OTHER PUBLICATIONS

3GPP TSG RAN Meeting #72, RP-161176, Motivation for further enhancement of cellular IoT for LTE, Buscan, South Korea, Jun. 13-16, 2016, pp. 1-8.

*Primary Examiner* — Peter Chen
(74) *Attorney, Agent, or Firm* — Foley & Lardner LLP (57) ABSTRACT

The present invention discloses a method for transmitting and receiving a paging message and an associated apparatus used for resolving the issue of an NB-IoT system in which only a main carrier, and not a secondary carrier, can transmit paging messages, resulting in a limited overall paging capacity for the system and inadequate services provided to NB-IoT terminals when there is a large number of such terminals. The method comprises: a terminal receiving system information transmitted from a base station, wherein the system information carries information of a carrier permitted to receive a paging message; the terminal determining, according to information of the carrier permitted to receive the paging message and a predetermined rule, a paging carrier, which is a main carrier or a secondary carrier of the (Continued)

base station; and the terminal receiving a paging message transmitted from the base station and carrier in the paging carrier.

18 Claims, 2 Drawing Sheets

(51) Int. Cl.
*H04W 4/80* (2018.01)
*H04L 1/16* (2006.01)
*H04W 8/08* (2009.01)
*H04W 8/22* (2009.01)
*H04W 88/02* (2009.01)

(52) U.S. Cl.
CPC ............... *H04W 8/08* (2013.01); *H04W 8/22* (2013.01); *H04W 68/00* (2013.01); *H04W 72/04* (2013.01); *H04W 72/0446* (2013.01); *H04W 72/0453* (2013.01); *H04W 88/023* (2013.01)

(58) Field of Classification Search
CPC ... H04L 5/0053; H04L 1/1607; H04L 1/1614; H04L 1/1671; H04L 1/1678; H04W 72/04; H04W 72/042; H04W 72/0446; H04W 72/0453; H04W 72/1289; H04W 68/00; H04W 68/02; H04W 68/005; H04W 8/08; H04W 8/22; H04W 4/80; H04W 88/023

See application file for complete search history.

(56) References Cited

U.S. PATENT DOCUMENTS

| | | | |
|---|---|---|---|
| 2012/0051279 A1* | 3/2012 | Li | H04W 68/00 370/312 |
| 2012/0327856 A1 | 12/2012 | Jung et al. | |
| 2013/0058280 A1 | 3/2013 | Kim et al. | |
| 2016/0029434 A1* | 1/2016 | Qiu | H04W 52/0209 370/311 |
| 2018/0270790 A1* | 9/2018 | Shi | H04W 68/005 |

FOREIGN PATENT DOCUMENTS

| | | |
|---|---|---|
| CN | 102217396 A | 10/2011 |
| CN | 102907152 A | 1/2013 |
| CN | 104219764 A | 12/2014 |
| JP | 2012-506196 | 3/2012 |
| KR | 20100042209 A | 4/2010 |
| KR | 20110117029 A | 10/2011 |
| WO | WO-2010/044620 A2 | 4/2010 |
| WO | WO 2010125769 A1 | 10/2012 |

* cited by examiner

METHOD FOR TRANSMITTING AND RECEIVING PAGING MESSAGE AND ASSOCIATED APPARATUS

This application is a National Stage of International Application No. PCT/CN2017/094500, filed Jul. 26, 2017, which claims priority of Chinese Patent Application No. 201610666484.2, filed with the Chinese Patent Office on Aug. 12, 2016, and entitled "A method and device for transmitting a paging message, and a method and device for receiving a paging message", both of which are hereby incorporated by reference in their entireties.

FIELD

The present invention relates to the field of communications, and particularly to a method and device for transmitting a paging message, and a method and device for receiving a paging message.

BACKGROUND

I. An introduction to Machine Type Communication (MTC).

MTC includes a variety of different communication technologies, e.g., machine to machine communication, machine controlled communication, human to machine communication, mobile intercommunication, etc., all of which are integrated in a system. As expected, Human to human communication services will possibly account for only one third of the entire user equipment market, and there will be a larger number of machine to machine communication services (in a system with a small bandwidth), in future.

The existing mobile communication network is designed for human to human communication, and for example, the capacity of the network is determined for human to human communication. In order to support communication in the system with a small bandwidth on the mobile communication network, the mechanism of the mobile communication network shall be optimized according to the characteristics of communication in the system with a small bandwidth so that there will be better communication in the system with a small bandwidth while insignificantly affecting or without affecting legacy human to human communication.

II. An introduction to NB-IoT.

The Working Item (WI) of Narrow Band Internet of Things (NB-IoT) has been ascertained and launched in the 3GPP Release 13 project.

An object of the narrow band Internet of things WI is to standardize the radio access technology of Cellular Internet of Things (CIoT). The technology is extended based upon the Long Term Evolution (LTE) or the LTE-Advanced (LTE-A) while taking into account network characteristics or goals generally including enhanced indoor conage, a support of a large number of accessing devices with a low speed, low delay-sensitivity, a lower cost of the devices, lower power consumption of the devices, an optimized network architecture, etc.

The existing NB-IoT communication may have the following characteristics:

An NB-IoT User Equipment (UE) has low mobility;

A period of time for which the NB-IoT UE transmits data with the network side is controllable, that is, the NB-IoT UE can only access in a network-specified period of time;

Data transmission between the NB-IoT UE and the network side is not required to be highly real-time, that is, is time-tolerant;

The NB-IoT UE is energy-limited, and required to consume extremely low power;

Only information of a small amount of data is transmitted between the NB-IoT UE and the network side;

There is low implementation complexity of the NB-IoT UE; etc.

An NB-IoT UE may have one or more of the characteristics of NB-IoT communication.

There are one primary carrier and a plurality of secondary carriers in an NB-IoT cell. A Primary Synchronization Signal (PSS), a Secondary Synchronization Signal (SSS), a Physical Broadcast Channel (PBCH), and system information. Moreover paging and a random access can only be made on the primary carrier. An idle user equipment can only reside on the primary carrier. After the UE is connected, an evolved Node B (eNB) can configure the UE to operate on a secondary carrier. The UE can only operate on one carrier, that is, it cannot operate concurrently on the primary carrier and the secondary carrier.

Since paging can only be sent on the primary carrier, but cannot be sent on any secondary carrier in the NB-IoT system, there is a limited paging capacity of the system as a whole, thus failing to better serve a vast number of NB-IoT UEs.

SUMMARY

Embodiments of the invention provide a method and device for transmitting a paging message, and a method and device for receiving a paging message so as to address the problem in the prior art that paging can only be sent on the primary carrier, but cannot be sent on any secondary carrier in the NB-IoT system, so there is a limited paging capacity of the system as a whole, thus failing to better serve a vast number of NB-IoT UEs.

Particular technical solutions according to the embodiments of the invention are as follows.

In a first aspect, an embodiment of the invention provides a method for receiving a paging message, the method including:

receiving, by a UE, system information sent by an eNB, wherein the system information carries information about carriers on which a paging message is allowed to be received;

determining, by the UE, a paging carrier according to the information about the carriers on which a paging message is allowed to be received, and a preset rule, wherein the paging carrier is a primary carrier or a secondary carrier of the eNB; and receiving, by the UE, a paging message sent by the eNB on the paging carrier.

In a possible implementation, the information about the carriers on which a paging message is allowed to be received includes at least one of follows:

downlink operating frequencies of the carriers;

uplink operating frequencies of the carriers;

information characterizing the indexes of the carriers;

a bitmap configuration of available downlink sub-frames;

a configuration of downlink timeslots;

in-band carrier information;

a paging density or densities of the primary carrier or the secondary carriers;

a default paging periodicity of the primary carrier or the secondary carriers; or a quantity of primary and secondary carriers on which a paging message is allowed to be received.

In a possible implementation, determining, by the UE, the paging carrier according to the information about the carriers on which a paging message is allowed to be received, and the preset rule includes:

determining, by the UE, the paging carrier in the equation of PC=floor (UE_ID/(N*Ns))mod Nc, wherein PC represents the index corresponding to the paging carrier; N represents min (T, nB), wherein nB represents a paging density, and T represents the default paging periodicity; Ns represents max (1, nB/TI); Nc represents the total number of paging carriers including the total number of primary and secondary carriers on which a paging message is allowed to be sent; and UE_ID is determined according to the identifier of the UE.

In a possible implementation, determining, by the UE, the paging carrier according to the information about the carriers on which a paging message is allowed to be received, and the preset rule includes:

determining, by the UE, a paging-carrier initial judgment variable in the equation of PCint=floor(UE_ID/nBmin)mod (nBall/nBmin), and to determining the paging carrier according to the paging-carrier initial judgment variable, wherein the paging-carrier initial judgment variable and the paging carrier satisfy the following constraint condition:

when PCint<(nB0)/nBmin. PCindex is 0; and
when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1:

wherein PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with an index i, wherein i=0, 1, . . . , nBall−1, nB0 represents the paging density of the primary carrier, and UE_ID is determined according to the identifier of the UE.

In a possible implementation, receiving, by the UE, the paging message sent by the eNB on the paging carrier includes:

residing, by the UE, on the paging carrier, and receiving the paging message sent by the UE on the paging carrier.

In a possible implementation, receiving, by the UE, the paging message sent by the eNB on the paging carrier includes:

if the paging carrier is not the primary carrier of the eNB, residing, by the UE, on the primary carrier of the eNB, and receiving the paging message sent by the UE on the paging carrier at a paging instance of time of the paging carrier.

In a possible implementation, the method further includes:

if the paging carrier is a secondary carrier, listening, by the UE, to system information update notification sent on the secondary carrier, and receiving updated system information on the primary carrier upon reception of the notification.

In a possible implementation, the method further includes:

if the paging carrier is a secondary carrier, then comparing, by the UE, a channel quality of the paging carrier with those of primary carriers in respective surrounding cells, and reselecting a cell according to comparison results.

In a second aspect, an embodiment of the invention provides a method for sending a paging message, the method including:

broadcasting, by an eNB, system information, wherein the system information carries information about carriers on which a paging message is allowed to be received; and sending, by the eNB, a paging message on a carrier on which a paging message is allowed to be received, wherein the carrier on which a paging message is allowed to be received is a primary carrier or a secondary carrier.

In a possible implementation, the information about the carriers on which a paging message is allowed to be received includes at least one of follows:

downlink operating frequencies of the carriers;
uplink operating frequencies of the carriers;
information characterizing the indexes of the carriers;
a bitmap configuration of available downlink sub-frames:
a configuration of downlink timeslots;
in-band carrier information;
a paging density or densities of the primary carrier or the secondary carriers;
a default paging periodicity of the primary carrier or the secondary carriers; and
a quantity of primary and secondary carriers on which a paging message is allowed to be received.

In a possible implementation, the method further includes
sending, by the eNB, a system information update notification on the carrier on which a paging message is allowed to be received, when system information is updated.

In a possible implementation, the method further includes
obtaining, by the eNB, information about whether a UE supports a capability to receive a paging message on a secondary carrier, and notifying a Mobility Management Entity (MME) of the information about whether the capability to receive a paging message on a secondary carrier is supported.

In a possible implementation, before the eNB sends the paging message on the carrier on which a paging message is allowed to be received, the method further includes:

receiving, by the eNB, information notified by a Mobility Management Entity (MME) about whether a UE supports a capability to receive a paging message on a secondary carrier, and determining whether the UE supports a capability to receive a paging message on a secondary carrier.

In a third aspect, an embodiment of the invention provides a UE including:

a first receiving module configured to receive system information sent by an eNB, wherein the system information carries information about carriers on which a paging message is allowed to be received;

a processing module configured to determine a paging carrier according to the information about the carriers on which a paging message is allowed to be received, and a preset rule, wherein the paging carrier is a primary carrier or a secondary carrier of the eNB; and a second receiving module configured to receive a paging message sent by the eNB on the paging carrier.

In a possible implementation, the information about the carriers on which a paging message is allowed to be received includes at least one of follows:

downlink operating frequencies of the carriers;
uplink operating frequencies of the carriers;
information characterizing the indexes of the carriers;
a bitmap configuration of available downlink sub-frames;
a configuration of downlink timeslots;
in-band carrier information;
a paging density or densities of the primary carrier or the secondary carriers;
a default paging periodicity of the primary carrier or the secondary carriers; and a quantity of primary and secondary carriers on which a paging message is allowed to be received.

In a possible implementation, the processing module is configured:

to determine the paging carrier in the equation of PC=floor(UE_ID/(N*Ns))mod Nc, wherein PC represents the index corresponding to the paging carrier; N represents min (T, nB), wherein nB represents a paging density, and T represents the default paging periodicity; Ns represents max (1, nB/T); Nc represents the total number of paging carriers including the total number of primary and secondary carriers on which a paging message is allowed to be sent; and UE_ID is determined according to the identifier of the UE.

In a possible implementation, the processing module is configured:

to determine a paging-carrier initial judgment variable in the equation of PCint=floor(UE_ID/nBmin)mod(nBall/nBmin), and to determine the paging carrier according to the paging-carrier initial judgment variable, wherein the paging-carrier initial judgment variable and the paging carrier satisfy the following constraint condition:

when PCint<(nB0)/nBmin, PCindex is 0; and
when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;

wherein PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with an index i, wherein i=0, 1, . . . , nBall−1, nB0 represents the paging density of the primary carrier, and UE_ID is determined according to the identifier of the UE.

In a possible implementation, the second receiving module is configured:

to reside on the paging carrier, and to receive the paging message sent by the UE on the paging carrier.

In a possible implementation, the second receiving module is configured:

if the paging carrier is not the primary carrier of the eNB, to reside on the primary carrier of the eNB, and to receive the paging message sent by the UE on the paging carrier at a paging instance of time of the paging carrier.

In a possible implementation, the second receiving module is further configured:

if the paging carrier is a secondary carrier, to listen to system information update notification sent on the secondary carrier, and to receive updated system information on the primary carrier upon reception of the notification.

In a possible implementation, the processing module is further configured:

if the paging carrier is a secondary carrier, to compare a channel quality of the paging carrier with those of primary carriers in respective surrounding cells, and to reselect a cell according to comparison results.

In a fourth aspect, an embodiment of the invention provides an eNB including:

a broadcasting module configured to broadcast system information, wherein the system information carries information about carriers on which a paging message is allowed to be received; and a sending module configured to send a paging message on a carrier on which a paging message is allowed to be received, wherein the carrier on which a paging message is allowed to be received is a primary carrier or a secondary carrier.

In a possible implementation, the information about the carriers on which a paging message is allowed to be received includes at least one of follows:

downlink operating frequencies of the carriers;
uplink operating frequencies of the carriers:
information characterizing the indexes of the carriers;
a bitmap configuration of available downlink sub-frames:
a configuration of downlink timeslots;
in-band carrier information;
a paging density or densities of the primary carrier or the secondary carriers;
a default paging periodicity of the primary carrier or the secondary carriers; and
a quantity of primary and secondary carriers on which a paging message is allowed to be received.

In a possible implementation, the sending module is further configured:

to send a system information update notification on the carrier on which a paging message is allowed to be received, when system information is updated.

In a possible implementation, the sending module is further configured:

to obtain information about whether a UE supports a capability to receive a paging message on a secondary carrier, and to notify a Mobility Management Entity (MME) of the information about whether the capability to receive a paging message on a secondary carrier is supported.

In a possible implementation, the eNB further includes a receiving module configured:

before the sending module sends the paging message on the carrier on which a paging message is allowed to be received, to receive information notified by a Mobility Management Entity (MME) about whether a UE supports a capability to receive a paging message on a secondary carrier, and to determine whether the UE supports a capability to receive a paging message on a secondary carrier.

In a fifth aspect, an embodiment of the invention provides a UE including a processor, a memory, and a transceiver, wherein the transceiver receives and transmits data under the control of the processor, the memory stores preset program, and the processor reads and executes the program in the memory:

to receive system information sent by an eNB through the transceiver, wherein the system information carries information about carriers on which a paging message is allowed to be received:

to determine a paging carrier according to the information about the carriers on which a paging message is allowed to be received, and a preset rule, wherein the paging carrier is a primary carrier or a secondary carrier of the eNB; and to receive a paging message sent by the eNB on the paging carrier through the transceiver.

In a possible implementation, the information about the carriers on which a paging message is allowed to be received includes at least one of follows:

downlink operating frequencies of the carriers:
uplink operating frequencies of the carriers:
information characterizing the indexes of the carriers;
a bitmap configuration of available downlink sub-frames;
a configuration of downlink timeslots;
in-band carrier information;
a paging density or densities of the primary carrier or the secondary carriers;

a default paging periodicity of the primary carrier or the secondary carriers; and a quantity of primary and secondary carriers on which a paging message is allowed to be received.

In a possible implementation, the processor is configured to determine the paging carrier in the equation of PC=floor(UE_ID/(N*Ns))mod Nc, wherein PC represents the index corresponding to the paging carrier; N represents min (T, nB), wherein nB represents a paging density, and T represents the default paging periodicity; Ns represents max (1, nB/T); Nc represents the total number of paging carriers including the total number of primary and secondary carriers on which a paging message is allowed to be sent; and UE_ID is determined according to the identifier of the UE.

In a possible implementation, the processor is configured to determine a paging-carrier initial judgment variable in the equation of PCint=floor(UE_ID/nBmin)mod(nBall/nBmin), and to determine the paging carrier according to the paging-carrier initial judgment variable, wherein the paging-carrier initial judgment variable and the paging carrier satisfy the following constraint condition:

when PCint<(nB0)/nBmin, PCindex is 0; and when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;

wherein PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with an index i, wherein i=0, 1, . . . , nBall−1, nB0 represents the paging density of the primary carrier, and UE_ID is determined according to the identifier of the UE.

In a possible implementation, the processor is configured to instruct the transceiver to reside on the paging carrier, and to receive the paging message sent by the UE on the paging carrier.

In a possible implementation, if the paging carrier is not the primary carrier of the eNB, then the processor is configured to instruct the transceiver to reside on the primary carrier of the eNB, and to receive the paging message sent by the UE on the paging carrier at a paging instance of time of the paging carrier.

In a possible implementation, if the paging carrier is a secondary carrier, then the processor is configured to listen to system information update notification sent on the secondary carrier, and to receive updated system information on the primary carrier upon reception of the notification, through the transceiver.

In a possible implementation, if the paging carrier is a secondary carrier, then the processor is configured to compare a channel quality of the paging carrier with those of primary carriers in respective surrounding cells, and to reselect a cell according to comparison results.

In a sixth aspect, an embodiment of the invention provides an evolved Node B including a processor, a memory, and a transceiver, wherein the transceiver receives and transmits data under the control of the processor, the memory stores preset program, and the processor reads and executes the program in the memory:

to broadcast system information through the transceiver, wherein the system information carries information about carriers on which a paging message is allowed to be received; and to instruct the transceiver to send a paging message on a carrier on which a paging message is allowed to be received, wherein the carrier on which a paging message is allowed to be received is a primary carrier or a secondary carrier.

In a possible implementation, the information about the carriers on which a paging message is allowed to be received includes at least one of follows:

downlink operating frequencies of the carriers;
uplink operating frequencies of the carriers:
information characterizing the indexes of the carriers;
a bitmap configuration of available downlink sub-frames:
a configuration of downlink timeslots;
in-band carrier information;
a paging density or densities of the primary carrier or the secondary carriers;
a default paging periodicity of the primary carrier or the secondary carriers; and
a quantity of primary and secondary carriers on which a paging message is allowed to be received.

In a possible implementation, the processor is further configured to instruct the transceiver to send a system information update notification on the carrier on which a paging message is allowed to be received, when system information is updated.

In a possible implementation, the processor is further configured to obtain information about whether a UE supports a capability to receive a paging message on a secondary carrier, and to notify a Mobility Management Entity (MME) of the information about whether the capability to receive a paging message on a secondary carrier is supported.

In a possible implementation, the processor is configured, before the transceiver is instructed to send the paging message on the carrier on which a paging message is allowed to be received, to receive information notified by a Mobility Management Entity (MME) about whether a UE supports a capability to receive a paging message on a secondary carrier, through the transceiver, and to determine whether the UE supports a capability to receive a paging message on a secondary carrier.

With the technical solutions above according to the embodiments of the invention, the UE receives the system information sent by the eNB, where the system information carries the information about the carriers on which a paging message is allowed to be received; and the UE determines a paging carrier according to the information about the carriers on which a paging message is allowed to be received, and the preset rule, and then receives a paging message sent by the eNB on the paging carrier, where the paging carrier is a primary carrier or a secondary carrier of the eNB, so that paging can be sent on the primary carrier and a secondary carrier to thereby improve the paging capacity of the NB-IoT system so as to address the problem in the prior art that paging can only be sent on the primary carrier, but cannot be sent on any secondary carrier, so there is a limited paging capacity of the system as a whole, thus failing to better serve a vast number of NB-IoT UEs.

DETAILED DESCRIPTION OF THE EMBODIMENTS

In order to make the objects, technical solutions, and advantages of the invention more apparent, the invention will be described below in further details reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Figure 1:
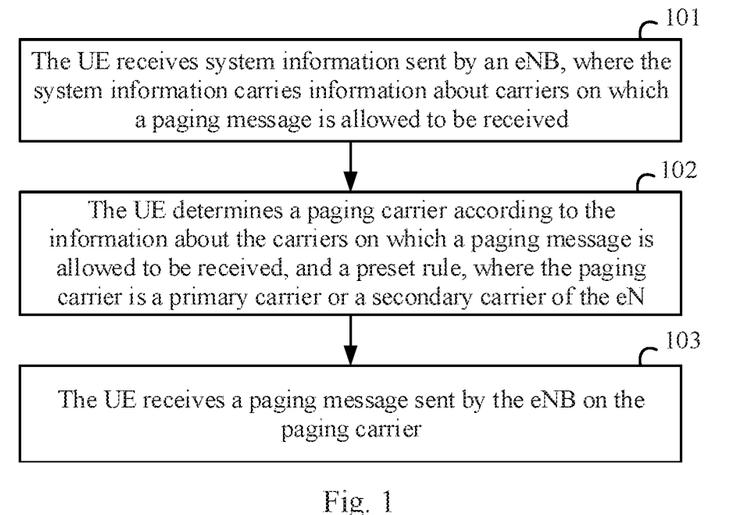
FIG. 1 is a schematic flow chart of receiving a paging message by a user equipment according to an embodiment of the invention.

As illustrated in FIG. 1, a User Equipment (UE) can receive a paging message according to an embodiment of the invention in the following flow.

In the step 101, the UE receives system information sent by an evolved Node B (eNB), where the system information carries information about carriers on which a paging message is allowed to be received.

Particularly, the UE has a capability to receive a paging message on a secondary carrier, and is idle.

In the embodiment of the invention, the information about the carriers on which a paging message is allowed to be received includes but will not be limited to any one or more of:

downlink operating frequencies of the carriers:
uplink operating frequencies of the carriers;
information characterizing the indexes of the carriers;
a bitmap configuration of available downlink sub-frames;
a configuration of downlink timeslots;
in-band carrier information;
the paging density or densities of the primary carrier or the secondary carriers;
a default paging periodicity of the primary carrier or the secondary carriers; and
the number of primary and secondary carriers on which a paging message is allowed to be received.

In the step 102, the UE determines a paging carrier according to the information about the carriers on which a paging message is allowed to be received, and a preset rule, where the paging carrier is a primary carrier or a secondary carrier of the eNB.

In the embodiment of the invention, the UE determines the paging carrier according to the information about the carriers on which a paging message is allowed to be received, and the preset rule in the following two implementations without any limitation thereto.

In a first implementation, the UE determines the paging carrier in the equation of PC=floor (UE_ID/(N*Ns))mod Nc, where floor( ) represents rounding down; mod represents a modulus operation; PC represents an index corresponding to the paging carrier, N represents min (T, nB), where nB represents a paging density, and T represents a default paging periodicity; Ns represents max (1, nB/T); Nc represents the total number of paging carriers including the total number of primary and secondary carriers on which a paging message is allowed to be sent; UE_ID is determined according to the identifier of the UE; min( ) represents the minimum function; and max( ) represents the maximum function.

In a second implementation, the UE determines a paging-carrier initial judgment variable in the equation of PCint=floor(UE_ID/nBmin)mod(nBall/nBmin), and determines the paging carrier according to the paging-carrier initial judgment variable, where the paging-carrier initial judgment variable and the paging carrier satisfy the following constraint condition:

when PCint<(nB0)/nBmin, PCindex is 0; and
when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;

where floor( ) represents rounding down, mod represents a modulus operation. PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with the index i, where i=0, 1 . . . , nBall−1, nB0 represents the paging density of the primary carrier, and UE_ID is determined according to the identifier of the UE.

In a particular embodiment. UE_ID is IMSI mod 4096 in the first or second implementation.

In the step 103, the UE receives a paging message sent by the eNB on the paging carrier.

In the embodiment of the invention, the UE receives a paging message sent by the eNB on the paging carrier in the following two implementations without any limitation thereto:

in a first implementation, the UE resides on the paging carrier, and receives a paging message sent by the eNB on the paging carrier;

in the first implementation, the paging message can be the primary carrier or a secondary carrier of the eNB:

in a second implementation, if the paging carrier is not the primary carrier of the eNB, then the UE will reside on the primary carrier of the eNB, and receive a paging message sent by the eNB on the paging carrier at a paging instance of time of the paging carrier In the embodiment of the invention, if the paging carrier is a secondary carrier, then when the UE resides on the secondary carrier, then the UE will listen to a system information update notification sent on the secondary carrier, and receive updated system information on the primary carrier upon reception of the notification. Optionally the UE selects a paging message based upon the latest system information after the system information is updated, where the UE can select a paging message as described above, so a repeated description thereof will be omitted here.

Particularly, when the UE resides on the secondary carrier, the UE receives the system information update notification by listening to a paging message or a Narrowband Physical Downlink Control Channel (NPDCCH).

Correspondingly, if there is be a UE to possibly reside on a secondary carrier in the system, then the eNB will send the NPDCCH or the paging message carrying the system information update notification on the secondary carrier supporting paging when the system information is updated.

In the embodiment of the invention, if the paging carrier is a secondary carrier, then the UE will compare a channel quality of the paging carrier with those of primary carriers in respective surrounding cells, and reselect a cell according to comparison results.

Figure 2:
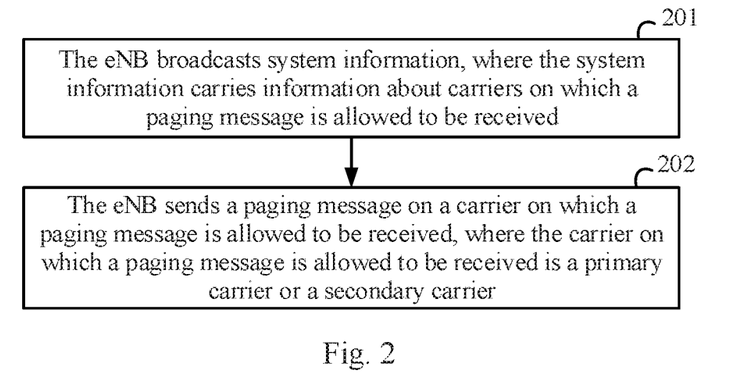
FIG. 2 is a schematic flow chart of sending a paging message by an evolved Node B according to an embodiment of the invention.

Based upon the same inventive idea, as illustrated in FIG. 2, an eNB can send a paging message according to an embodiment of the invention in the following flow.

In the step 201, the eNB broadcasts system information, where the system information carries information about carriers on which a paging message is allowed to be received.

In the embodiment of the invention, the information about the carriers on which a paging message is allowed to be received includes but will not be limited to any one or more of:

downlink operating frequencies of the carriers:
uplink operating frequencies of the carriers;
information characterizing the indexes of the carriers;
a bitmap configuration of available downlink sub-frames;
a configuration of downlink timeslots;
in-band carrier information;
the paging density or densities of the primary carrier or the secondary carriers;
a default paging periodicity of the primary carrier or the secondary carriers; and
the number of primary and secondary carriers on which a paging message is allowed to be received.

In the step 202, the eNB sends a paging message on a carrier on which a paging message is allowed to be received, where the carrier on which a paging message is allowed to be received is a primary carrier or a secondary carrier.

In the embodiment of the invention, the eNB sends a system information update notification on the carrier on which a paging message is allowed to be received, when system information is updated.

Correspondingly, if there is be a UE to possibly reside on a secondary carrier in the system, then the eNB will send an NPDCCH or a paging message carrying the system information update notification on the secondary carrier supporting paging when the system information is updated.

In the embodiment of the invention, the eNB obtains information about whether the UE supports a capability to receive a paging message on a secondary carrier, and notifies a Mobility Management Entity (MME) of the information about whether the capability to receive a paging message on a secondary carrier is supported. For example, the eNB notifies the MME of the information about whether the UE supports the capability to receive a paging message on a secondary carrier, when a UE connection is released.

Optionally, before a paging message is sent on the carrier on which a paging message is allowed to be received, the eNB receives information notified by an MME about whether the UE supports a capability to receive a paging message on a secondary carrier, and determines whether the UE supports the capability to receive a paging message on a secondary carrier.

Particularly, when the UE is subsequently paged, the MME notifies the eNB to send a paging message, of the information about whether the UE supports the capability to receive a paging message on a secondary carrier, and for example, the MME notifies the eNB to send a paging message, of the information about whether the UE supports the capability to receive a paging message on a secondary carrier, via an S1 message. The eNB to send a paging message sends a paging message by sending the paging message only to the UE supporting reception of a paging message on a secondary carrier. If the UE does not support reception of a paging message on a secondary carrier, then the eNB will send a paging message as in the prior art, and only page the UE on the primary carrier.

Sending and reception of a paging message will be described below in details in connection with several particular embodiments thereof.

A first particular embodiment relates to a first calculation equation of a paging carrier.

In this particular embodiment, the eNB broadcasts information about three secondary carriers on which a paging message can be received in the current cell, in system information of a primary carrier, where the information includes any one or more of:

downlink operating frequencies of the secondary carriers;
uplink operating frequencies of the secondary carriers; the indexes of the secondary carriers, where the indexes can be implicitly or explicitly carried; a bitmap configuration of available downlink sub-frames; a configuration of downlink timeslots; in-band carrier information; etc.

For example, the index of the primary carrier is 0, and the indexes of three secondary carriers are 1, 2, and 3 respectively. Furthermore the system information of the eNB includes a paging density represented as nB, where all the paging densities of the respective carriers (including the primary carrier and the secondary carriers) in the cell are nB.

A default paging periodicity T is further broadcasted in the system information of the eNB, where all the default paging periodicities of the respective carriers (including the primary carrier and the secondary carriers) in the cell are the default paging periodicity T, and particularly the default paging periodicity T is 128 radio frames. In this particular embodiment, nB is 2T, where T is the default paging periodicity T broadcasted by the eNB.

For example, the UE_ID of the idle UE is 257, and the UE supports reception of a paging message on a secondary carrier; and for example, the UE supports a multi-carrier capability, so the UE calculates the index of the paging carrier in Equation 1 upon reception of the information, about the secondary carrier on which a paging message can be received, in the system information, where Equation 1 is represented as:

$$PC = \mathrm{floor}(UE\_ID/(N*Ns)) \bmod Nc,$$

where PC represents the index of the paging carrier, which is a carrier on which the UE receives a paging message, where the index of the paging carrier calculated in Equation 1 corresponds to the index of a paging carrier in the system information; T represents the default paging periodicity, which is particularly carried in the system information broadcasted by the eNB, where the value of T is 128 radio frames in this particular embodiment; nB represents the paging density, which is carried in the system information broadcasted by the eNB, where the value of NB is 2T in this particular embodiment; N represents min (T, nB), where the value of T is T in this particular embodiment; Ns is represented as max (1, nB/T), where the value of Ns is 2 in this particular embodiment; UE_ID is represented as IMSI mod 4096, where the value of UE_ID is 257 in this particular embodiment; Nc represents the total number of paging carriers including the total number of primary and secondary carriers on which paging can be sent, where the value of Nc is 4 in this particular embodiment.

The UE calculates PC as PC=floor (UE_ID/(N*Ns))mod Nc=floor (257/256)mod 4=1 in Equation 1, so the paging carrier of the UE is the secondary carrier with the index 1.

The UE receives a paging message on the secondary carrier with the index 1 in the following two implementations without any limitation thereto:

in a first implementation, the UE resides on the secondary carrier with the index 1, and receives a paging message; and in a second implementation, the UE resides on the primary carrier all the time, but receives a paging message on the secondary carrier with the index 1 only at a paging instance of time of the secondary carrier.

In this particular embodiment, the eNB obtains information about whether the UE supports a capability to receive a paging message on a secondary carrier, and for example, whether the UE supports a multi-carrier capability, and notifies an MME of the information; and for example, the eNB notifies the MME when a UE connection is released, and when the UE is subsequently paged, the MME notifies the information to an eNB to send a paging message, and for example, notifies the information to the eNB to send a paging message, in an S1 message.

In order to send a paging message, the eNB sends the paging message to the UE supporting reception of a paging message on a secondary carrier, as described in this particular embodiment; and for the UE which does not support reception of a paging message on a secondary carrier, the eNB pages the UE on the primary carrier by sending the paging message as in the prior art.

A second particular embodiment relates to a second calculation equation of a paging carrier.

The eNB broadcasts information about two secondary carriers on which a paging message can be received in the current cell, in system information of a primary carrier, where the information includes any one or more of:

downlink operating frequencies of the secondary carriers; uplink operating frequencies of the secondary carriers; the indexes of the secondary carriers, where the indexes can be implicitly or explicitly carried; a bitmap configuration of available downlink sub-frames; a configuration of downlink timeslots; in-band carrier information; etc.

Here the indexes of the two secondary carriers are 1 and 2 respectively.

The system information of the eNB includes three paging densities (nBs), and each carrier corresponds to one of the paging densities, where the nB of the primary carrier is T/2, where T is a default paging periodicity broadcasted by the eNB; the NB of the secondary carrier 1 is T; and the nB of the secondary carrier 2 is T/2.

A default paging periodicity T is further broadcasted in the system information of the eNB, where all the default paging periodicities of the respective carriers (including the primary carrier and the secondary carriers) in the cell are the default paging periodicity T. and the value of T is 128 radio frames in this particular embodiment.

The UE_ID of the idle UE is 193, and the UE supports reception of a paging message on a secondary carrier (e.g., a multi-carrier capability), so the UE calculates the index of the paging carrier in Equation 2 upon reception of the information, about the secondary carrier on which a paging message can be received, in the system information, where Equation 2 is represented as:

PCint=floor(UE_ID/$n$Bmin)mod($n$Ball/$n$Bmin), where when PCint<(nB0)/nBmin, a corresponding PCindex is 0; and
when $(\Sigma_{i=0}^{PCindex-1} nBi)/nBmin <= PCint < (\Sigma_{i=0}^{PCindex} nBi)/nBmin$, a corresponding value of PCindex is i, where i is an integer, and i>=1.

where PCint represents a paging-carrier initial judgment variable:

PCindex represents the index of a paging carrier, which is a paging on which the UE receives a paging message, where PC0 represents a paging carrier which is the primary carrier, and the other values of PCindex represent secondary carriers; and the index represented by PCindex corresponds respectively to a secondary carrier index broadcasted in the system information;

T represents the default paging periodicity broadcasted by the eNB in the system information, where the value of T in this particular embodiment is 128 radio frames;

nB represents a paging density broadcasted by the eNB in the system information;

nBanchor represents the paging density of the primary carrier, where the value of nBanchor is T/2 in this particular embodiment; and nBnon-anchor represents the paging density of a secondary carrier, where the value of nBnon-anchor of the secondary carrier 1 is T, and the value of nBnon-anchor of the secondary carrier 2 is T/2, in this particular embodiment;

nBmin=min(nBanchor, nBnon-anchor(s)), where the value of nBmin is T/2 in this particular embodiment;

nBall=nBanchor+nBnon-anchor(s), where the value of nBall is 2T in this particular embodiment;

nBi represents the paging density of some carrier, where i=0, 1, . . . , nBall−1, where nB0 represents the paging density of the primary carrier, and the other nBi's represent the paging densities of the respective secondary carriers; and i corresponds respectively in a secondary carrier index broadcasted in the system information. In this particular embodiment, $nB_0$=T/2, $nB_1$=T, $nB_2$=T/2; and UE_ID represents IMSI mod 4096, where the value of UE_ID is 193 in this particular embodiment.

The UE calculates PCint as PCint=floor (UE_ID/nBmin) mod(nBall/nBmin)=floor (193/64)mod 4=3 in Equation 2.

Furthermore, since $(\Sigma_{i=0}^{PCindex-1} nBi)/nBmin <= PCint < (\Sigma_{i=0}^{PCindex} nBi)/nBmin$, that is, (nB0+nB1)/nBmin<=PCint<(nB0+nB1+nB2)/nBmin, the UE can calculate the value of PCindex as 2 corresponding to PCint=3, so the paging carrier of the UE is the secondary carrier with the index 2.

The UE receives a paging message on the secondary carrier with the index 2 in the following two implementations without any limitation thereto:

in a first implementation, the UE resides on the secondary carrier with the index 2, and receives a paging message; and in a second implementation, the UE resides on the primary carrier all the time, but receives a paging message on the secondary carrier with the index 2 only at a paging instance of time of the secondary carrier.

In this particular embodiment, the eNB obtains information about whether the UE supports a capability to receive a paging message on a secondary carrier (for example, whether the UE supports a multi-carrier capability), and notifies an MME of the information (for example when a UE connection is released), and when the UE is subsequently paged, the MME notifies the information to an eNB to send a paging message, and for example, notifies the information to the eNB to send a paging message, in an S1 message.

In order to send a paging message, the eNB sends the paging message to the UE supporting reception of a paging message on a secondary carrier, as described in this particular embodiment; and if the UE does not support reception of a paging message on a secondary carrier, then the eNB will page the UE on the primary carrier by sending the paging message as in the prior art.

A third particular embodiment relates to cell reselection.

When a UE resides on a paging carrier (a secondary carrier or a primary carrier), and receives a paging message, the UE compares a channel quality of the paging carrier on which it is currently residing, with those of primary carriers in respective surrounding cells, and reselect a cell as in the prior art.

A fourth particular embodiment relates to system information updating.

When a UE resides on a paging carrier (a secondary carrier or a primary carrier), and receives a paging message, the UE receives a system information update notification by listening to a paging message or an NPDCCH, and if the UE receives the update notification, then the UE will go back to the primary carrier, and receive updated system information. The UE selects a paging carrier based upon the latest system information upon reception of the system information, and resides on the paging carrier.

Correspondingly, if there is be a UE to possibly reside on a secondary carrier in the system, then the eNB will send an NPDCCH or a paging message carrying the system information update notification on the secondary carrier supporting paging when the system information is updated.

In a fifth particular embodiment, a capability of a UE to receive a paging message is passed.

An eNB 1 obtains information about whether the UE supports the capability to receive a paging message on a secondary carrier, e.g., whether the UE supports a multi-carrier capability, and notifies an MME of the information (for example, when a UE connection is released).

When the eNB 1 is subsequently paged, the MME notifies the information to an eNB 2 and an eNB 3 to send a paging message, and for example, notifies the information to the eNBs to send a paging message, in an S1 message.

In order to send a paging message, the eNB 2 and an eNB 3 send the paging message to the UE supporting reception of a paging message on a secondary carrier, as described in the first or second particular embodiment; and if the UE does not support reception of a paging message on a secondary carrier, then eNB 2 and an eNB 3 will page the UE on the primary carrier by sending the paging message as in the prior art.

Figure 3:
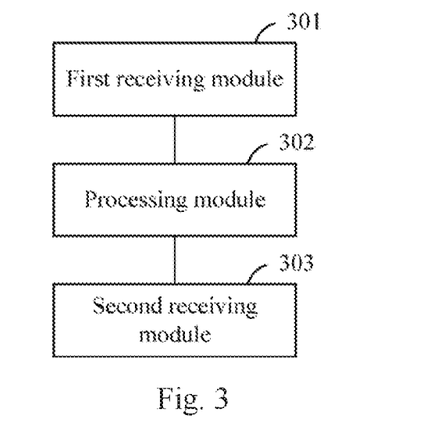
FIG. 3 is a schematic structural diagram of a user equipment according to an embodiment of the invention.

Based upon the same inventive idea, an embodiment of the invention provides a UE, and for a particular implementation of the UE, reference can be made to the description of the method according to the embodiment of the invention, so a repeated description thereof will be omitted here; and as illustrated in FIG. 3, the UE generally includes:

a first receiving module 301 is configured to receive system information sent by an eNB, where the system information carries information about carriers on which a paging message is allowed to be received;

a processing module 302 is configured to determine a paging carrier according to the information about the carriers on which a paging message is allowed to be received, and a preset rule, where the paging carrier is a primary carrier or a secondary carrier of the eNB; and a second receiving module 303 is configured to receive a paging message sent by the eNB on the paging carrier.

In a possible implementation, the information about the carriers on which a paging message is allowed to be received includes but will not be limited to any one or more of:

downlink operating frequencies of the carriers; uplink operating frequencies of the carriers; information characterizing the indexes of the carriers; a bitmap configuration of available downlink sub-frames; a configuration of downlink timeslots; in-band carrier information; the paging density or densities of the primary carrier or the secondary carriers; a default paging periodicity of the primary carrier or the secondary carriers; and the number of primary and secondary carriers on which a paging message is allowed to be received.

In a possible implementation, the processing module is configured:

to determine the paging carrier in the equation of PC=floor(UE_ID/(N*Ns))mod Nc, where PC represents the index corresponding to the paging carrier; N represents min (T, nB), where nB represents a paging density, and T represents the default paging periodicity; Ns represents max (1, nB/T); Nc represents the total number of paging carriers including the total number of primary and secondary carriers on which a paging message is allowed to be sent; and UE_ID is determined according to the identifier of the UE.

In a possible implementation, the processing module is configured:

to determine a paging-carrier initial judgment variable in the equation of PCint=floor(UE_ID/nBmin)mod(nBall/nBmin), and to determine the paging carrier according to the paging-carrier initial judgment variable, where the paging-carrier initial judgment variable and the paging carrier satisfy the following constraint condition:

when PCint<(nB0)/nBmin, PCindex is 0; and when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;

where PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min (nBanchor, nBnon-anchor), nBall=nBanchor+nBnon-anchor, nBi represents the paging density of a carrier with an index i, where i=0, 1, . . . , nBall−1, nB0 represents the paging density of the primary carrier, and UE_ID is determined according to the identifier of the UE.

In a possible implementation, the second receiving module is configured to reside on the paging carrier, and to receive the paging message sent by the UE on the paging carrier.

In a possible implementation, the second receiving module is configured:

if the paging carrier is not the primary carrier of the eNB, to reside on the primary carrier of the eNB, and to receive the paging message sent by the UE on the paging carrier at a paging instance of time of the paging carrier.

In a possible implementation, the second receiving module is further configured:

if the paging carrier is a secondary carrier, to listen to system information update notification sent on the secondary carrier, and to receive updated system information on the primary carrier upon reception of the notification.

In a possible implementation, the processing module is further configured:

if the paging carrier is a secondary carrier, to compare a channel quality of the paging carrier with those of primary carriers in respective surrounding cells, and to reselect a cell according to comparison results.

Figure 4:
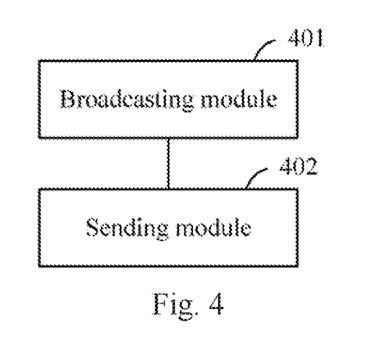
FIG. 4 is a schematic structural diagram of an evolved Node B according to an embodiment of the invention.

Based upon the same inventive idea, an embodiment of the invention provides an eNB, and for a particular implementation of the eNB, reference can be made to the description of the method according to the embodiment of the invention, so a repeated description thereof will be omitted here; and as illustrated in FIG. 4, the eNB generally includes:

a broadcasting module 401 is configured to broadcast system information, where the system information carries information about carriers on which a paging message is allowed to be received; and a sending module 402 is configured to send a paging message on a carrier on which a paging message is allowed to be received, where the carrier on which a paging message is allowed to be received is a primary carrier or a secondary carrier.

In a possible implementation, the information about the carriers on which a paging message is allowed to be received includes but will not be limited to any one or more of:

downlink operating frequencies of the carriers; uplink operating frequencies of the carriers; information characterizing the indexes of the carriers; a bitmap configuration of available downlink sub-frames; a configuration of downlink timeslots; in-band carrier information; the paging density or densities of the primary carrier or the secondary carriers; a default paging periodicity of the primary carrier or the secondary carriers; and the number of primary and secondary carriers on which a paging message is allowed to be received.

In a possible implementation, the sending module is further configured:

to send a system information update notification on the carrier on which a paging message is allowed to be received, when system information is updated.

In a possible implementation, the sending module is further configured:

to obtain information about whether a UE supports a capability to receive a paging message on a secondary carrier, and to notify a Mobility Management Entity (MME) of the information about whether the capability to receive a paging message on a secondary carrier is supported.

In a possible implementation, the eNB further includes a receiving module configured, before the sending module sends the paging message on the carrier on which a paging message is allowed to be received, to receive information notified by a Mobility Management Entity (MME) about whether a UE supports a capability to receive a paging message on a secondary carrier, and to determine whether the UE supports a capability to receive a paging message on a secondary carrier.

Figure 5:
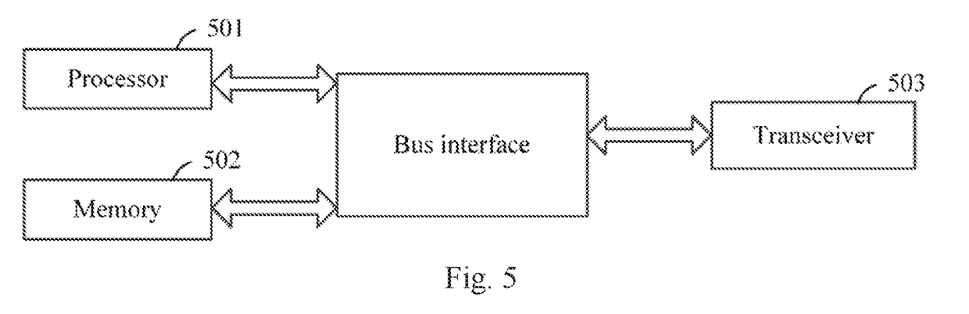
FIG. 5 is a schematic structural diagram of another equipment according to an embodiment of the invention.

Based upon the same inventive idea, an embodiment of the invention provides a UE, and for a particular implementation of the UE, reference can be made to the description of the method according to the embodiment of the invention, so a repeated description thereof will be omitted here; and as illustrated in FIG. 5, the UE generally includes a processor 501, a memory 502, and a transceiver 503, where the transceiver 503 receives and transmits data under the control of the processor 501, the memory 502 stores preset program, and the processor 501 reads and executes the program in the memory 502:

to receive system information sent by an eNB through the transceiver 503, where the system information carries information about carriers on which a paging message is allowed to be received;

to determine a paging carrier according to the information about the carriers on which a paging message is allowed to be received, and a preset rule, where the paging carrier is a primary carrier or a secondary carrier of the eNB; and to receive a paging message sent by the eNB on the paging carrier through the transceiver 503.

In a possible implementation, the information about the carriers on which a paging message is allowed to be received includes but will not be limited to any one or more of:

downlink operating frequencies of the carriers; uplink operating frequencies of the carriers; information characterizing the indexes of the carriers; a bitmap configuration of available downlink sub-frames; a configuration of downlink timeslots; in-band carrier information; the paging density or densities of the primary carrier or the secondary carriers; a default paging periodicity of the primary carrier or the secondary carriers; and the number of primary and secondary carriers on which a paging message is allowed to be received.

In a possible implementation, the processor 501 is configured to determine the paging carrier in the equation of PC=floor (UE_ID/(N*Ns))mod Nc, where PC represents the index corresponding to the paging carrier; N represents min (T, nB), where nB represents a paging density, and T represents the default paging periodicity; Ns represents max (1, nB/T); Nc represents the total number of paging carriers including the total number of primary and secondary carriers on which a paging message is allowed to be sent; and UE_ID is determined according to the identifier of the UE.

In a possible implementation, the processor 501 is configured to determine a paging-carrier initial judgment variable in the equation of PCint=floor(UE_ID/nBmin)mod (nBall/nBmin), and to determine the paging carrier according to the paging-carrier initial judgment variable, where the paging-carrier initial judgment variable and the paging carrier satisfy the following constraint condition:

when PCint<(nB0)/nBmin, PCindex is 0; and when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;

where PCint represents the paging-carrier initial judgment variable. PCindex represents the index of the paging carrier, nB represents a paging density, nBranchor represents the paging density of the primary carrier, nBnon-anchor represents the paging density of a secondary carrier, nBmin=min (nBanchor, nBnon-anchor), nBall=nBanchor+nBnon-anchor, nBi represents the paging density of a carrier with an index i, where i=0, 1, . . . , nBall−1, nB0 represents the paging density of the primary carrier, and UE_ID is determined according to the identifier of the UE.

In a possible implementation, the processor 501 is configured to instruct the transceiver 503 to reside on the paging carrier, and to receive the paging message sent by the UE on the paging carrier.

In a possible implementation, if the paging carrier is not the primary carrier of the eNB, then the processor 501 is configured to instruct the transceiver 503 to reside on the primary carrier of the eNB, and to receive the paging message sent by the UE on the paging carrier at a paging instance of time of the paging carrier.

In a possible implementation, if the paging carrier is a secondary carrier, then the processor 501 is configured to listen to system information update notification sent on the secondary carrier, and to receive updated system information on the primary carrier upon reception of the notification, through the transceiver 503.

In a possible implementation, if the paging carrier is a secondary carrier, then the processor 501 is configured to compare a channel quality of the paging carrier with those of primary carriers in respective surrounding cells, and to reselect a cell according to comparison results.

Figure 6:
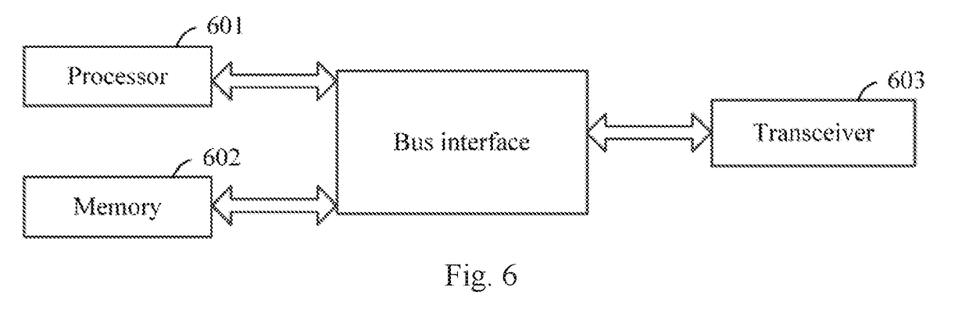
FIG. 6 is a schematic structural diagram of another evolved Node B according to an embodiment of the invention.

Based upon the same inventive idea, an embodiment of the invention provides an eNB, and for a particular implementation of the eNB, reference can be made to the description of the method according to the embodiment of the invention, so a repeated description thereof will be omitted here; and as illustrated in FIG. 6, the eNB generally includes a processor 601, a memory 602, and a transceiver 603, where the transceiver 603 receives and transmits data under the control of the processor 601, the memory 602 stores preset program, and the processor 601 reads and executes the program in the memory 602:

to broadcast system information through the transceiver 603, where the system information carries information about carriers on which a paging message is allowed to be received; and to instruct the transceiver 603 to send a paging message on a carrier on which a paging message is allowed to be received, where the carrier on which a paging message is allowed to be received is a primary carrier or a secondary carrier.

In a possible implementation, the information about the carriers on which a paging message is allowed to be received includes but will not be limited to any one or more of:

downlink operating frequencies of the carriers; uplink operating frequencies of the carriers; information characterizing the indexes of the carriers; a bitmap configuration of available downlink sub-frames; a configuration of downlink timeslots; in-band carrier information; the paging density or densities of the primary carrier or the secondary carriers; a default paging periodicity of the primary carrier or the secondary carriers; and the number of primary and secondary carriers on which a paging message is allowed to be received.

In a possible implementation, the processor is further configured to instruct the transceiver to send a system information update notification on the carrier on which a paging message is allowed to be received, when system information is updated.

In a possible implementation, the processor is further configured to obtain information about whether a UE supports a capability to receive a paging message on a secondary carrier, and to notify an MME of the information about whether the capability to receive a paging message on a secondary carrier is supported.

In a possible implementation, the processor is configured, before the transceiver is instructed to send the paging message on the carrier on which a paging message is allowed to be received, to receive information notified by a Mobility Management Entity (MME) about whether a UE supports a capability to receive a paging message on a secondary carrier, through the transceiver, and to determine whether the UE supports a capability to receive a paging message on a secondary carrier.

With the technical solutions above, in the embodiments of the invention, the UE receives the system information sent by the eNB, where the system information carries the information about the carriers on which a paging message is allowed to be received; and the UE determines a paging carrier according to the information about the carriers on which a paging message is allowed to be received, and the preset rule, and then receives a paging message sent by the eNB on the paging carrier, where the paging carrier is a primary carrier or a secondary carrier of the eNB, so that paging can be sent on the primary carrier and a secondary carrier to thereby improve the paging capacity of the NB-IoT system so as to address the problem in the prior art that paging can only be sent on the primary carrier, but cannot be sent on any secondary carrier, so there is a limited paging capacity of the system as a whole, thus failing to better serve a vast number of NB-IoT UEs.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for receiving a paging message, the method comprising:

receiving, by a User Equipment (UE), system information sent by an evolved Node B (eNB), wherein the system information carries information about carriers on which the paging message is allowed to be received;

determining, by the UE, a paging carrier according to the information about the carriers on which the paging message is allowed to be received, and a preset rule, wherein the paging carrier is a primary carrier or a secondary carrier of the eNB; and receiving, by the UE, the paging message sent by the eNB on the paging carrier;

wherein determining, by the UE, the paging carrier according to the information about the carriers on which the paging message is allowed to be received, and the preset rule comprises:

determining, by the UE, the paging carrier in the equation of PC=floor (UE_ID/(N*Ns)) mod Nc, wherein PC represents an index corresponding to the paging carrier; N represents min (T, nB), wherein nB represents a paging density, and T represents the default paging periodicity; Ns represents max (1, nB/T); Nc represents a total number of paging carriers comprising a total number of primary and secondary carriers on which the paging message is allowed to be sent and UE_ID is determined according to the identifier of the UE; or determining, by the UE, a paging-carrier initial judgment variable in the equation of PCint=floor(UE_ID/nBmin) mod (nBall/nBmin), and to determining the paging carrier according to the paging-carrier initial judgment variable, wherein the paging-carrier initial judgment variable and the paging carrier satisfy the following constraint condition:

when PCint<(nB0)/nBmin, PCindex is 0; and when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;

wherein PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with an index i, wherein i=0, 1, . . . , nBall−1, nB0 represents the paging density of the primary carrier, and UE_ID is determined according to the identifier of the UE.

2. The method according to claim 1, wherein the information about the carriers on which the paging message is allowed to be received comprises at least one of:
   downlink operating frequencies of the carriers;
   uplink operating frequencies of the carriers;
   information characterizing the indexes of the carriers;
   a bitmap configuration of available downlink sub-frames;
   a configuration of downlink timeslots;
   in-band carrier information;
   a paging density or densities of the primary carrier or the secondary carriers;
   a default paging periodicity of the primary carrier or the secondary carriers; or
   a quantity of primary and secondary carriers on which the paging message is allowed to be received.

3. The method according to claim 1, wherein receiving, by the UE, the paging message sent by the eNB on the paging carrier comprises:
   residing, by the UE, on the paging carrier, and receiving the paging message sent by the UE on the paging carrier; or
   if the paging carrier is not the primary carrier of the eNB, residing, by the UE, on the primary carrier of the eNB, and receiving the paging message sent by the UE on the paging carrier at a paging instance of time of the paging carrier.

4. The method according to claim 1, wherein the method further comprises:
   if the paging carrier is a secondary carrier, listening, by the UE, to system information update notification sent on the secondary carrier, and receiving updated system information on the primary carrier upon reception of the notification.

5. A method for sending a paging message, the method comprising:

broadcasting, by an evolved Node B (eNB), system information, wherein the system information carries information about carriers on which the paging message is allowed to be received; and sending, by the eNB, the paging message on a carrier on which the paging message is allowed to be received, so that the paging message is received by a user equipment, UE on a paging carrier, wherein the carrier on which the paging message is allowed to be received is a primary carrier or a secondary carrier, and the paging carrier is determined by the UE according to the information about the carriers on which the paging message is allowed to be received and the preset rule;

wherein:

the paging carrier is determined by the UE in the equation of PC=floor (UE_ID/(N*Ns)) mod Nc, wherein PC represents an index corresponding to the paging carrier; N represents min (T, nB), wherein nB represents a paging density, and T represents the default paging periodicity; Ns represents max (1, nB/T); Nc represents a total number of paging carriers comprising a total number of primary and secondary carriers on which a paging message is allowed to be sent and UE_ID is determined according to the identifier of the UE, or the paging carrier is determined by the UE according to a paging-carrier initial judgment variable, wherein the paging-carrier initial judgment variable in the equation of PCint=floor(UE_ID/nBmin) mod (nBall/nBmin), and the paging-carrier initial judgment variable and the paging carrier satisfy the following constraint condition:

when PCint<(nB0)/nBmin, PCindex is 0; and when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;

wherein PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with an index i, wherein i=0, 1, . . . , nBall−1, nB0 represents the paging density of the primary carrier, and UE_ID is determined according to the identifier of the UE.

6. The method according to claim 5, wherein the information about the carriers on which the paging message is allowed to be received comprises at least one of:
   downlink operating frequencies of the carriers;
   uplink operating frequencies of the carriers;
   information characterizing the indexes of the carriers;
   a bitmap configuration of available downlink sub-frames;
   a configuration of downlink timeslots;
   in-band carrier information;
   a paging density or densities of the primary carrier or the secondary carriers;
   a default paging periodicity of the primary carrier or the secondary carriers; or
   a quantity of primary and secondary carriers on which the paging message is allowed to be received.

7. The method according to claim 5, further comprises:
   sending, by the eNB, a system information update notification on the carrier on which the paging message is allowed to be received, when the system information is updated.

8. The method according to claim 5, further comprises:
obtaining, by the eNB, information about whether the UE supports a capability to receive the paging message on the secondary carrier, and notifying a Mobility Management Entity (MME) of the information about whether the capability to receive the paging message on the secondary carrier is supported.

9. The method according to claim 5, wherein before the eNB sends the paging message on the carrier on which the paging message is allowed to be received, the method further comprises:
receiving, by the eNB, information notified by a Mobility Management Entity (MME) about whether a UE supports a capability to receive the paging message on the secondary carrier, and determining whether the UE supports a capability to receive the paging message on the secondary carrier.

10. A User Equipment (UE), comprising: a processor, a memory, and a transceiver, wherein the transceiver receives and transmits data under the control of the processor, the memory stores preset program, and the processor reads and executes the program in the memory:
to receive system information sent by an evolved Node B (eNB) through the transceiver, wherein the system information carries information about carriers on which a paging message is allowed to be received;
to determine a paging carrier according to the information about the carriers on which the paging message is allowed to be received, and a preset rule, wherein the paging carrier is a primary carrier or a secondary carrier of the eNB; and
to receive the paging message sent by the eNB on the paging carrier through the transceiver;
the processor further reads and executes the program in the memory;
to determine, by the UE, the paging carrier in the equation of PC=floor (UE_ID/(N*Ns)) mod Nc, wherein PC represents an index corresponding to the paging carrier; N represents min (T, nB), wherein nB represents a paging density, and T represents the default paging periodicity; Ns represents max (1, nB/T); Nc represents a total number of paging carriers comprising a total number of primary and secondary carriers on which the paging message is allowed to be sent and UE_ID is determined according to the identifier of the UE; or
to determine, by the UE, a paging-carrier initial judgment variable in the equation of PCint=floor(UE_ID/nBmin) mod (nBall/nBmin), and to determining the paging carrier according to the paging-carrier initial judgment variable, wherein the paging-carrier initial judgment variable and the paging carrier satisfy the following constraint condition:
when PCint<(nB0)/nBmin, PCindex is 0; and
when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;
wherein PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with an index i, wherein i=0, 1, . . . , nBall−1, nB0 represents the paging density of the primary carrier, and UE_ID is determined according to the identifier of the UE.

11. The UE according to claim 10, wherein the information about the carriers on which the paging message is allowed to be received comprises at least one of:
downlink operating frequencies of the carriers;
uplink operating frequencies of the carriers;
information characterizing the indexes of the carriers;
a bitmap configuration of available downlink sub-frames;
a configuration of downlink timeslots;
in-band carrier information;
the paging density or densities of the primary carrier or the secondary carriers;
a default paging periodicity of the primary carrier or the secondary carriers; or
a quantity of primary and secondary carriers on which the paging message is allowed to be received.

12. The UE according to claim 10, wherein the processor reads and executes the program in the memory:
to reside on the paging carrier, and to receive the paging message sent by the UE on the paging carrier.

13. The UE according to claim 10, wherein the processor reads and executes the program in the memory:
if the paging carrier is not the primary carrier of the eNB, to reside on the primary carrier of the eNB, and to receive the paging message sent by the UE on the paging carrier at a paging instance of time of the paging carrier;
if the paging carrier is a secondary carrier, to listen to system information update notification sent on the secondary carrier, and to receive updated system information on the primary carrier upon reception of the notification.

14. An evolved Node B (eNB), comprising: a processor, a memory, and a transceiver, wherein the transceiver receives and transmits data under the control of the processor, the memory stores preset program, and the processor reads and executes the program in the memory:
to broadcast system information through the transceiver, wherein the system information carries information about carriers on which a paging message is allowed to be received; and
to instruct the transceiver to send the paging message on a carrier on which the paging message is allowed to be received, so that the paging message is received by a user equipment, UE on a paging carrier, wherein the carrier on which the paging message is allowed to be received is a primary carrier or a secondary carrier, and the paging carrier is determined by the UE according to the information about the carriers on which the paging message is allowed to be received and the preset rule;
wherein:
the paging carrier is determined by the UE in the equation of PC=floor (UE_ID/(N*Ns)) mod Nc, wherein PC represents an index corresponding to the paging carrier; N represents min (T, nB), wherein nB represents a paging density, and T represents the default paging periodicity; Ns represents max (1, nB/T); Nc represents a total number of paging carriers comprising a total number of primary and secondary carriers on which a paging message is allowed to be sent and UE_ID is determined according to the identifier of the UE, or
the paging carrier is determined by the UE according to a paging-carrier initial judgment variable, wherein the paging-carrier initial judgment variable in the equation of PCint=floor(UE_ID/nBmin) mod (nBall/nBmin), and the paging-carrier initial judgment variable and the paging carrier satisfy the following constraint condition:

when PCint<(nB0)/nBmin, PCindex is 0; and
when $(\Sigma_{i=0}^{PCindex-1} nBi)/nBmin <= PCint < (\Sigma_{i=0}^{PCindex} nBi)/nBmin$, a corresponding value of PCindex is i, wherein i is an integer, and i>=1;
wherein PCint represents the paging-carrier initial judgment variable, PCindex represents the index of the paging carrier, nB represents a paging density, nBranchor represents the paging density of the primary carrier, nBnon-anchor represents the paging density of a secondary carrier, nBmin=min(nBanchor, nBnon-anchor), nBall=nBanchor+nBnon-anchor, nBi represents the paging density of a carrier with an index i, wherein i=0, 1, ..., nBall−1, nB0 represents the paging density of the primary carrier, and UE_ID is determined according to the identifier of the UE.

15. The eNB according to claim 14, wherein the information about the carriers on which the paging message is allowed to be received comprises at least one of:
  downlink operating frequencies of the carriers;
  uplink operating frequencies of the carriers;
  information characterizing the indexes of the carriers;
  a bitmap configuration of available downlink sub-frames;
  a configuration of downlink timeslots;
  in-band carrier information;
  a paging density or densities of the primary carrier or the secondary carriers;
  a default paging periodicity of the primary carrier or the secondary carriers; or
  a quantity of primary and secondary carriers on which the paging message is allowed to be received.

16. The eNB according to claim 14, wherein the processor reads and executes the program in the memory:
  to send a system information update notification on the carrier on which the paging message is allowed to be received, when the system information is updated.

17. The eNB according to claim 14, wherein the processor reads and executes the program in the memory:
  to obtain information about whether a UE supports a capability to receive the paging message on a secondary carrier, and to notify a Mobility Management Entity (MME) of the information about whether the capability to receive the paging message on a secondary carrier is supported.

18. The eNB according to claim 14, wherein the processor reads and executes the program in the memory:
  before sending the paging message on the carrier on which the paging message is allowed to be received, to receive information notified by a Mobility Management Entity (MME) about whether the UE supports a capability to receive the paging message on a secondary carrier, and to determine whether the UE supports a capability to receive the paging message on a secondary carrier.

* * * * *